(No Model.)
J. B. ERWIN.
SELF BALANCING BICYCLE ATTACHMENT.
No. 590,568. Patented Sept. 28, 1897.
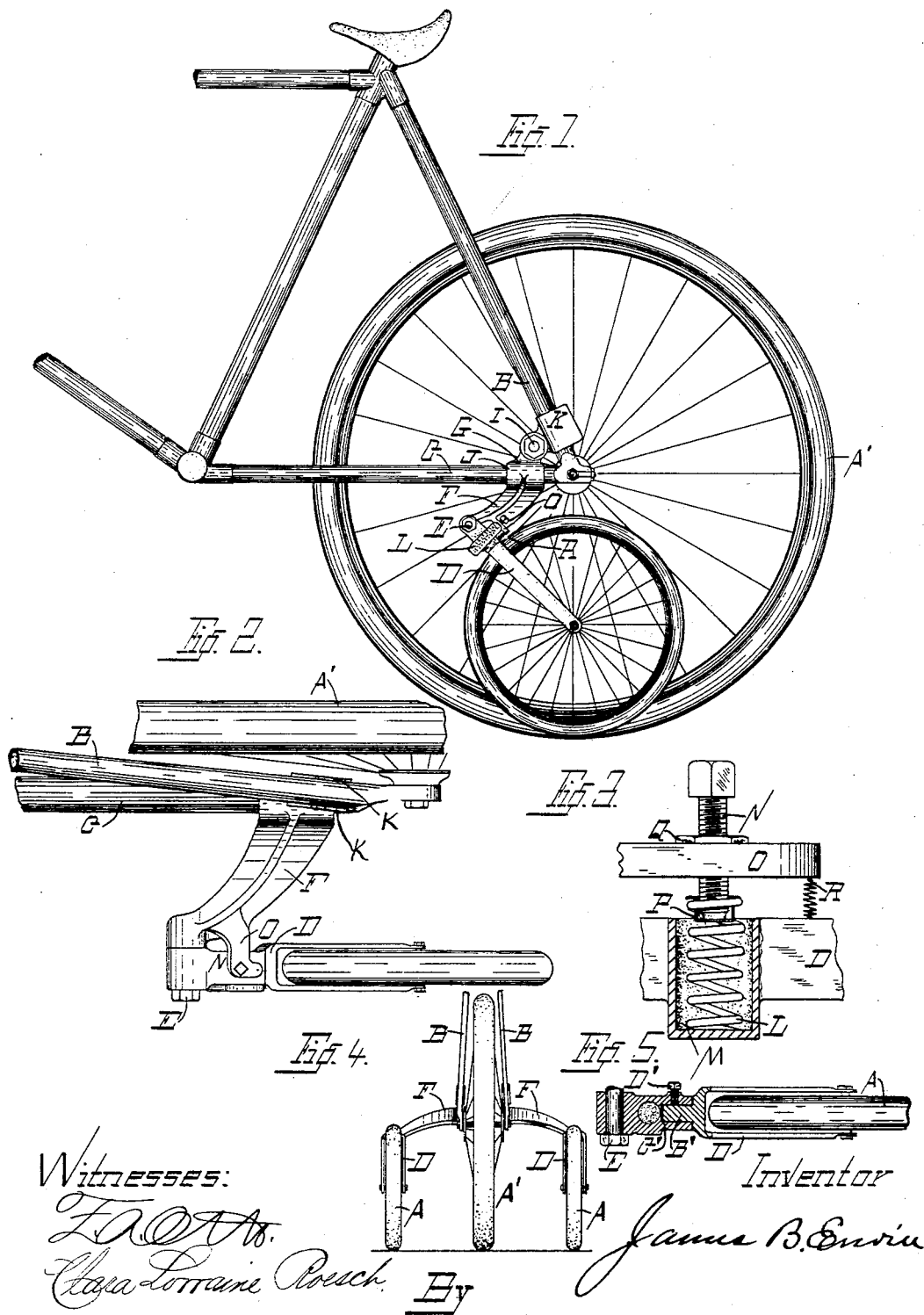
Witnesses:
Inventor
James B. Erwin
By

UNITED STATES PATENT OFFICE.

JAMES B. ERWIN, OF MILWAUKEE, WISCONSIN.

SELF-BALANCING BICYCLE ATTACHMENT.

SPECIFICATION forming part of Letters Patent No. 590,568, dated September 28, 1897.

Application filed April 15, 1896. Serial No. 587,647. (No model.)

*To all whom it may concern:*

Be it known that I, JAMES B. ERWIN, a citizen of the United States, residing at Milwaukee, in the county of Milwaukee and State of Wisconsin, have invented new and useful Improvements in Self-Balancing Bicycle Attachments, of which the following is a specification.

My invention relates to improvements in self-balancing bicycle attachments.

The object of my invention is to provide a device by which a bicycle may be yieldingly supported when in motion in such a manner as to conform to the various inclinations of the surface over which it moves as well as to the various inclinations of the bicycle and rider to such surface when turning corners or moving in a circular course, while at the same time the yielding bearings will aid an inexperienced rider when learning to steady the bicycle and maintain the same in its natural position, also by which the bicycle when relieved from lateral weight or pressure will be thrown to and supported in a vertical position.

The construction of my invention is further explained by reference to the accompanying drawings, in which—

Figure 1 represents a side view of a part of an ordinary bicycle provided with my device. Fig. 2 is a detail showing a top view of the device as it appears upon one side of the driving-wheel of a bicycle, a similar device being attached upon the opposite side of such wheel. Fig. 3 is an enlarged view of a part of the device illustrated in Fig. 2, showing the yielding bearing-support of the yoke and arm of one of the side wheels. Fig. 4 is a rear view showing the rear or driving wheel of the bicycle provided with the two supporting side wheels and their yielding bearings. Fig. 5 is a detail.

Like parts are referred to by the same reference-letters throughout the several views.

A A are the balancing or supporting side wheels of my device, which are adapted to be temporarily connected with the frame-pieces B and C of the bicycle by the bifurcated swinging arms D, pivotal bolts E, supporting-arms F, clamping-plates G and H, and clamping-bolts I. The clamping-plates G and H are respectively provided at their lower ends with recesses or semicircular bearing-plates J, which conform in shape to the shape of the supporting frame-bar C, around which they are clamped, while the upper ends of said clamping-plates are provided with flat bearings K, which are adapted to permit of being clamped to the bar B when said bar B is at any of the varying inclinations or angles to the bar C as may be found to exist in the various styles or makes of bicycles.

Downward pressure, caused by the inclination of the bicycle toward the right or left from the vertical, is resisted by the respective side wheels A A and the yielding bearings, consisting of the bifurcated swinging arms D, pivotal bolts E, and spiral springs L, which bearing-springs L, while they are sufficiently rigid to hold the empty bicycle in the vertical position and materially aid the inexperienced rider in maintaining his balance in the proper upright position they are at the same time sufficiently elastic to permit the driving-wheel A' to bear upon the ground with sufficient weight to produce the required traction for propelling the bicycle and also to permit the side wheels to pass freely over an obstruction, while they also yield, as stated, to the inclination of the bicycle to laterally-inclining roadways or the required inclination of the bicycle when moving rapidly in a circular course.

The lower end of the spring L is supported in a pocket or recess M, formed in the upper end of the bifurcated arm D, as shown in Figs. 1 and 3, and its upper end is provided with a sleeve or thimble P for the reception of the tension-screw N. The tension-screw N is supported from the arm F by the lug O.

When desirous to make the yielding bearings more rigid, as may be required by an inexperienced rider, the resistance of the tension-springs L and the yielding bearings against which they act is increased by turning down the screws N against such springs. When, however, the need of such support becomes less, the resistance to such bearings is diminished by turning such screws outward.

Q is a lock-nut by which the screw N is secured where adjusted. To prevent the bifurcated arms D from swinging downward to the vertical as the bicycle is raised, a light spiral spring R is provided. The spiral spring R is attached at one end to the arm D and at the opposite end to the supporting-lug O.

It is obvious that the supporting side wheels may be connected to the side of the bicycle by various other equivalent means, the essential object being to so connect them by flexible joints or springs, or both joints and springs, that they will yieldingly support the bicycle against lateral weight or pressure, whereby the inexperienced rider is aided in maintaining his balance whether moving over a laterally-inclined surface or rapidly in a circular course.

To provide for adjusting and retaining the supporting-wheels A in a true vertical position regardless of the varying inclinations of the frame-bar B to the different bicycles to which the device may be attached, the arms D are preferably formed in two parts, the lower wheel-supporting ends of which are provided with a shank B', which is closely fitted into a socket C', formed therefor in the upper or pivotal ends of said arms, thus forming a kind of swivel-joint, which when the supporting-arms have been clamped to the bicycle-frames inclined in either direction from the vertical will permit the wheels A to be adjusted in the vertical regardless of the inclination of such frames. When the wheels A have been thus adjusted, they are secured at such point by the set-screw D'.

Having thus described my invention, what I claim as new, and desire to secure by Letters Patent, is—

1. In a self-balancing bicycle, the combination with the respective side bars of a bicycle-frame of a wheel-supporting arm; a trunnion or pivotal support attached to the outer end of said arm; a swinging arm pivoted at its upper end to each of said pivotal supports; supporting side wheels having journal-bearings in the free ends of each of said swinging arms; a spring or elastic bearing located between said swinging arms and a stationary part of said supporting-arms, said swinging arms being adapted to turn upon their pivotal supports and said springs or elastic bearings being adapted to resist the rocking or lateral movement of the bicycle, and to yieldingly support the same in a vertical position, substantially as and for the purpose specified.

2. In a self-balancing bicycle the combination of the arms F, F rigidly affixed to the frame-bars of the bicycle; swinging arms D attached pivotally to said arms F; supporting side wheels A having journal or axial bearings in said swinging arms; springs or yielding bearings L interposed between said swinging arms D and said stationary bearing-lugs O and adjustable tension-screws N, said screws N having screw-threaded bearings in said lugs O and adapted to bear at their lower ends against said tension-springs, whereby the resistance of said tension-springs may be adjusted to correspond with the load or lateral pressure thereon, substantially as and for the purpose specified.

3. In a self-balancing bicycle, the combination with the arms F, F each rigidly affixed at one end to the frame-bars of the bicycle; swinging arms D attached pivotally to said side arms F; supporting side wheels A having axial or journal bearings in said swinging arms, said swinging arms D being formed in two separate parts, one of which parts is provided with a cylindrical shank B' and the other with a socket C' for the reception of said shank B'; and a set-screw D' adapted to impinge upon and lock said shank at any desired point of adjustment, substantially as and for the purpose specified.

4. In a self-balancing bicycle, the combination of the arms F, F rigidly affixed to the frame-bars of the bicycle; swinging arms D pivotally attached to said arms F; supporting side wheels A having journal-bearings on said swinging arms; spring or yielding bearings L interposed between said swinging arms D and stationary bearing-lugs O; adjustable tension-screws N, having screw-threaded bearings in said lugs O and adapted to bear at their lower ends against said tension-springs; and arm-supporting springs R, said springs R being attached at one end to said swinging arms D, and at their other ends to the stationary lugs O, all substantially as and for the purpose specified.

In testimony whereof I affix my signature in the presence of two witnesses.

JAMES B. ERWIN.

Witnesses:
LENORA NORTHROP,
CLARA L. ROESCH.